US010817824B2

(12) United States Patent
Richardson et al.

(10) Patent No.: US 10,817,824 B2
(45) Date of Patent: Oct. 27, 2020

(54) PARCEL BOX

(71) Applicant: OTTER PRODUCTS, LLC, Fort Collins, CO (US)

(72) Inventors: Curtis R. Richardson, Fort Collins, CO (US); Thomas D. Smith, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 523 days.

(21) Appl. No.: 15/455,273

(22) Filed: Mar. 10, 2017

(65) Prior Publication Data
US 2017/0286905 A1    Oct. 5, 2017

Related U.S. Application Data

(60) Provisional application No. 62/316,956, filed on Apr. 1, 2016.

(51) Int. Cl.
*G06Q 10/08* (2012.01)
*A47G 29/14* (2006.01)
(Continued)

(52) U.S. Cl.
CPC ....... *G06Q 10/0832* (2013.01); *A47G 29/141* (2013.01); *G06Q 10/0836* (2013.01); *H02J 7/35* (2013.01); *A47G 2029/144* (2013.01); *A47G 2029/145* (2013.01); *A47G 2029/146* (2013.01); *A47G 2029/147* (2013.01);
(Continued)

(58) Field of Classification Search
CPC .......... G06Q 10/0832; G06Q 10/0836; A47G 2029/143; A47G 29/141; H02J 7/35
See application file for complete search history.

(56) References Cited

U.S. PATENT DOCUMENTS 6,456,900 B1    9/2002 Kakuta
6,690,997 B2    2/2004 Rivalto
(Continued)

FOREIGN PATENT DOCUMENTS

WO    2001000069 A2    1/2001

OTHER PUBLICATIONS

Package Recipients Can Now Customize Deliveries to their Home with FedEx Delivery Manager, Apr. 23, 2013 https://newsroom.fedex.com/newsroom/package-recipients-can-now-customize-deliveries-to-their-home-with-fedex-delivery-manager/ (Year: 2013).*
(Continued)

*Primary Examiner* — Rupangini Singh

(57) ABSTRACT

A parcel box includes a weather resistant housing, a temperature control system, a communication module, and electrical circuitry. The weather resistant housing includes a lockable door for providing access to a protected cavity configured for receiving a parcel for temporary secure storage of the parcel. The temperature control system selectively controls a temperature inside the protected cavity. The communication module receives delivery data including an estimated delivery time for the parcel. The electrical circuitry operates the temperature control system to adjust the temperature of the protected cavity to within a preferred temperature range prior to the estimated delivery time of the parcel and maintains the temperature for at least a specified period of time.

24 Claims, 3 Drawing Sheets

(51) Int. Cl.
*H02J 7/35* (2006.01)
*H04W 84/04* (2009.01)

(52) U.S. Cl.
CPC .. *A47G 2029/148* (2013.01); *A47G 2029/149* (2013.01); *H04W 84/042* (2013.01)

(56) References Cited

U.S. PATENT DOCUMENTS

| | | |
|---|---|---|
| 6,967,575 B1 | 11/2005 | Dohrmann et al. |
| 7,183,919 B2 | 2/2007 | Wang |
| 8,661,862 B2 | 3/2014 | Mikolajczyk et al. |
| 9,453,758 B2 | 9/2016 | Motoyama |
| 2001/0045449 A1 | 11/2001 | Shannon |
| 2002/0035515 A1 | 3/2002 | Moreno |
| 2002/0184497 A1 | 12/2002 | Gage et al. |
| 2004/0018157 A1 | 1/2004 | Masters et al. |
| 2005/0104730 A1 | 5/2005 | Yang |
| 2006/0010077 A1 | 1/2006 | Dohrmann et al. |
| 2009/0201198 A1 | 8/2009 | Moudy |
| 2013/0144428 A1 | 6/2013 | Irwin et al. |
| 2014/0136594 A1* | 5/2014 | Belmonte .......... G06Q 10/0833 709/202 |
| 2014/0149308 A1* | 5/2014 | Ming .................. G06Q 10/0833 705/333 |
| 2015/0018684 A1 | 1/2015 | Abe et al. |
| 2015/0102903 A1 | 4/2015 | Wilkinson |
| 2015/0120529 A1* | 4/2015 | Faaborg ............... G06Q 10/083 705/39 |
| 2015/0120601 A1* | 4/2015 | Fee .................... G06Q 10/0836 705/339 |
| 2015/0145643 A1 | 5/2015 | Fadell et al. |
| 2015/0156031 A1* | 6/2015 | Fadell .................. G08B 19/005 700/276 |
| 2016/0066733 A1* | 3/2016 | Gozar .................. A47G 29/141 232/18 |
| 2016/0171435 A1* | 6/2016 | Newton ............. G06Q 10/0833 705/333 |
| 2016/0189498 A1 | 6/2016 | Sharma et al. |
| 2016/0235236 A1* | 8/2016 | Byers .................... A47G 29/14 |
| 2017/0228692 A1* | 8/2017 | Pargoe ............... G06Q 10/0836 |

OTHER PUBLICATIONS

BoxLock—How it works, accessed Oct. 2, 2019, https://www.getboxlock.com/how-it-works.

\* cited by examiner

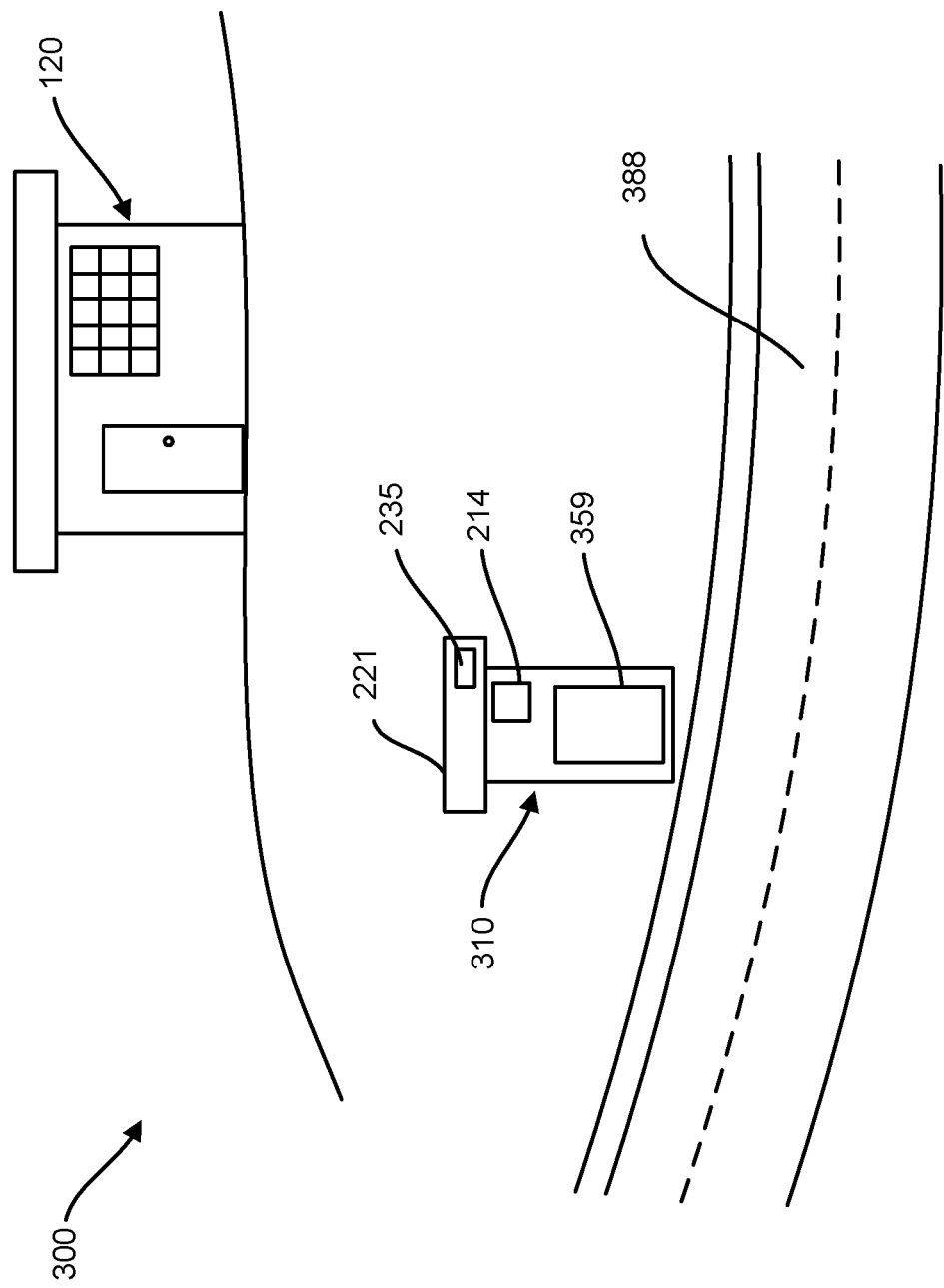

PARCEL BOX

CROSS REFERENCE TO RELATED APPLICATIONS

This application claims priority to U.S. Provisional Patent Application No. 62/316,956, filed Apr. 1, 2016, the entire contents of which is hereby incorporated by reference.

FIELD

This disclosure relates to apparatuses, systems, and methods for receiving and delivering parcels. Specifically, this disclosure relates to a smart parcel box and systems and methods which make use of the smart parcel box.

BACKGROUND

The growth of e-commerce and online shopping, expanded use of the Internet, and the increased efficiency of distribution and delivery systems, among other things, have led to an increase in parcel deliveries. Even in situations where products are not ordered using e-commerce or online methods, products are increasingly shipped from more centralized locations rather than being stocked at a larger number of widely distributed stores or warehouses. Customers order an increasing number of products and types of products for delivery to their home or business rather than visiting a local business in person to purchase the products.

Delivery of parcels can be problematic, particularly to residential locations, for a number of reasons including: the recipient is not home or available to receive the parcel, parcels left unattended may be subject to theft or environmental damage, parcel re-delivery is time consuming and costly, parcel return is costly, and returned or undelivered parcels often lead to dissatisfied customers. Parcel deliveries are often missed because no one is present to accept the parcel, because no one is free to answer the door to accept the parcel, because one is at work, because one is traveling, and/or for other reasons. If a parcel is left outside, it may not be picked up for an extended period of time if the person is traveling, is staying at another residence, and/or does not realize the parcel has been left. Shipping companies often leave door tags giving the recipient the option of scheduling a re-delivery or picking up the parcel or package at another location. Such options can be inconvenient, challenging, and/or frustrating for the recipient.

Recipients often try to plan orders ahead of time by estimating when the order will be delivered and attempting to coordinate the deliver with work or travel schedules. In addition, as automated and semi-automated methods of parcel shipping and delivery are explored, improved apparatuses, systems, and methods of parcel receipt will be necessary to realize the full advantages of these improved shipping and delivery methods.

The term 'parcel' is used herein to describe any type of package, box, or delivered item or items, including food delivery. The term parcel may include items that are delivered from a distance through a shipping company or items that are delivered directly by a local provider, such as a grocery delivery service from a local supermarket. The term parcel may also refer to an item that is not in a traditional shipping box or container. As used herein, the term 'parcel' may refer to boxes, packages, bags, envelopes, letters, papers, documents, gifts, delivered food, groceries, flowers, pharmaceuticals, books, magazines, newspapers, or any other item that might be delivered.

Improved apparatuses, systems, and methods for delivery and receipt of parcels are needed to improve efficiencies, reduce costs for shipping companies, improve customer satisfaction, improve customer convenience, and/or support continued growth of e-commerce and online ordering activities. While many of the examples herein are described with respect to delivery of parcels to residential locations, the disclosed apparatuses, systems, and methods are also applicable to business locations, retail locations, and anywhere a parcel may be delivered. Furthermore, even though many of the examples of herein are described with respect to delivery of parcels, the disclosed apparatuses, systems, and methods may also be used when shipping a package or parcel and leaving it for pick up by a delivery service, shipping service, or courier.

SUMMARY

Apparatuses, methods, systems, and techniques for delivery and receipt of parcels are provided. In one example, a parcel box includes a weather resistant housing, a temperature control system, a communication module, and electrical circuitry. The weather resistant housing includes a lockable door for providing access to a protected cavity for receiving a parcel for temporary secure storage. The temperature control system selectively controls a temperature inside the protected cavity. The communication module receives delivery data including an estimated delivery time for the parcel. The electrical circuitry operates the temperature control system to adjust the temperature of the protected cavity to within a preferred temperature range prior to the estimated delivery time of the parcel and maintains the temperature for at least a specified period of time.

In another example, a parcel box includes a weather resistant housing, an electronically controlled lock, an optical device, an internal parcel reader, a communication module, and electrical circuitry. The weather resistant housing includes a lockable door. The lockable door provides access to a cavity or storage area inside the weather resistant housing for receiving the parcel for temporary secure storage of the parcel. The electronically controlled lock is for locking and unlocking the lockable door. The optical device captures optical data external to the parcel box and the electronically controlled lock unlocks the door if the captured external optical data satisfies access criteria. The internal parcel reader reads parcel information from the parcel inside the cavity. The communication module is configured for wirelessly transmitting the parcel data for delivery to an electronic device that is external to and separate from the parcel box. The electrical circuitry is configured for controlling one or more of the electronically controlled lock, the optical device, the internal parcel reader, and the communication module.

Various other embodiments and variations of the apparatuses, methods, and systems are also disclosed. While multiple embodiments are disclosed, still other embodiments will become apparent to those skilled in the art from the following detailed description and figures, which describe and show illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which:

FIG. 3 illustrates an installed parcel box in a use environment.

DETAILED DESCRIPTION

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

As described above, improved apparatuses, systems, and methods are needed for parcel delivery. Improved apparatuses, systems, and methods are needed to improve efficiencies and conveniences for parcel recipients, for shipping companies, and/or for parcel shippers. The improved apparatuses, systems, and methods may not only improve efficiencies and conveniences, but may also make it more practical to use parcel delivery services for a wider variety of products. While most of the examples provided herein are described with respect to receipt of parcels, the apparatuses, systems, and methods disclosed herein may also be used for shipping of parcels and for transfer of parcels from a shipper to a shipping service provider.

Figure 1:
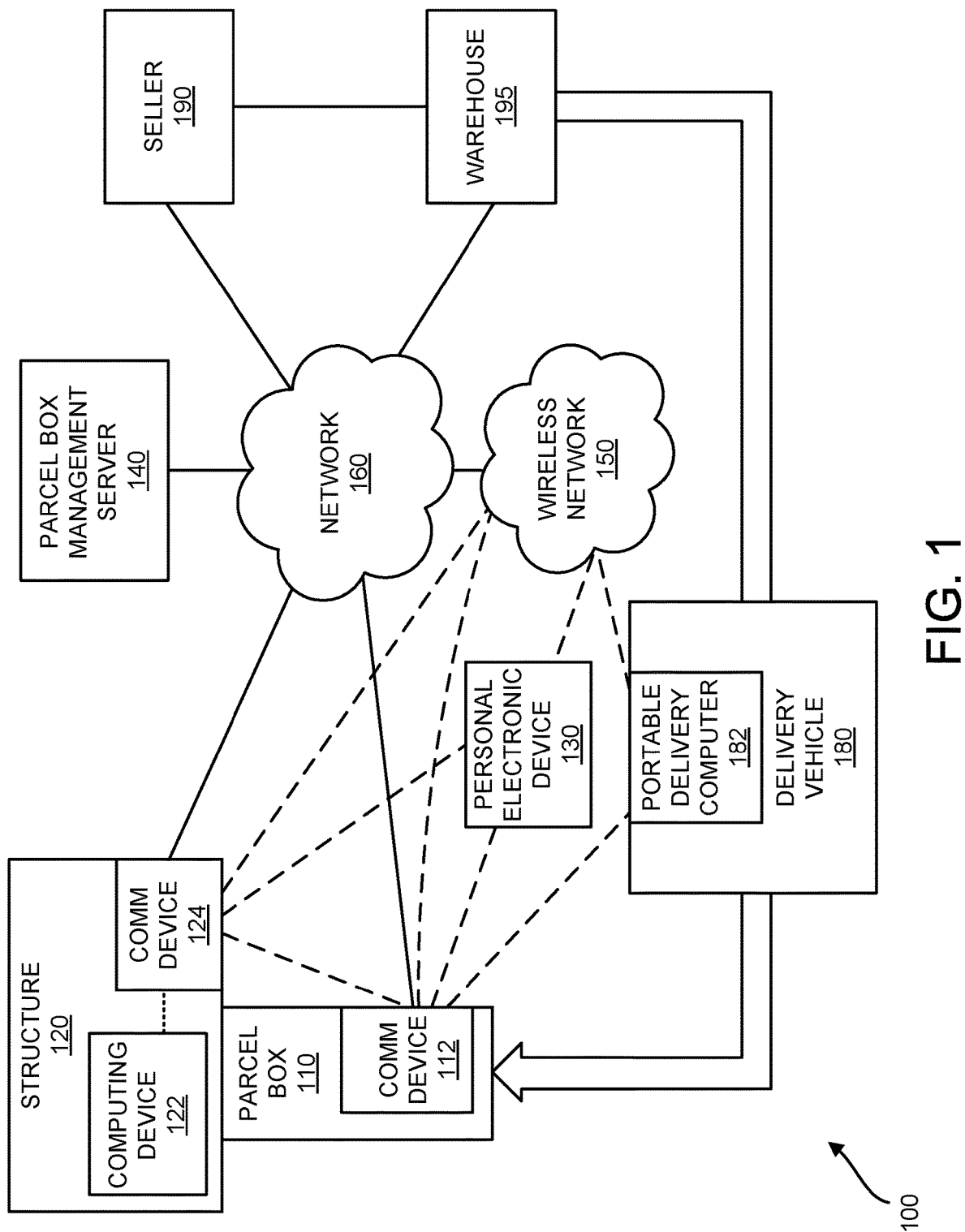
FIG. 1 illustrates an operating environment in which a parcel box may be used.

FIG. 1 illustrates an operating environment 100 in which a parcel box 110 may be used. Parcel box 110 is associated with a structure 120. Structure 120 may be a house, a condominium building, an apartment building, an office, a business building, a warehouse, a garage, a recreational vehicle, a boat, a cabin, and/or any other structure or location where one or more people may wish receive parcels. While parcel box 110 is illustrated as being attached to structure 120, and may even be integrated into structure 120, this configuration is not necessary. Parcel box 110 may simply be near or in proximity to structure 120 and need not be physically attached to or in contact with structure 120. In one example, parcel box 110 may be placed elsewhere on the same property or lot as structure 120 such that parcel box 110 is convenient for access by a shipping company and/or does not visually detract from structure 120. In some configurations, parcel box 110 may be integrated into a wall of structure 120 such that parcel box 110 is accessible, or at least partially accessible, from both inside and outside structure 120. In some situations, parcel box 110 may also be referred to as a delivery box, a package box, and/or a storage locker.

Parcel box 110 includes communication device 112. As will be described in various examples provided herein, parcel box 110 is a smart parcel box that electronically communicates with one or more other devices using communication device 112. Communication device 112 may be configured and/or adapted for uni-directional and/or bidirectional communication. Communication device 112 may include any type of electrical or electronic components such as a transmitter, a receiver, a modulator, a demodulator, an amplifier, an antenna, a mixer, a filter, a computer processor, a digital signal processor, memory, analog components, digital components, an integrated circuit, an application specific integrated circuit (an ASIC), a programmable device, a printed circuit board, an electrical connector, an electromechanical connector, and/or any other electrical, electronic, and/or electromechanical components for performing communication functions. Communication device 112 may be configured for wired and/or wireless communication methods. Communication device 112 may utilize or comply with one or more communication formats, protocols, or systems including: cellular communication standards, LTE, UMTS, WiMAX, EV-DO, CDMA, GSM, Bluetooth, Bluetooth Low Energy, Bluetooth Smart, Wireless Fidelity (WiFi), Zigbee, ANT, ANT+, Thread, Internet Protocol (IP), Ethernet, Fast Ethernet, Gigabit Ethernet, ATM, FDDI, Near Field Communication (NFC), proprietary formats or protocols, and/or combinations thereof.

In FIG. 1, dashed lines are generally used to represent wireless communication links and solid lines are generally used to represent wired communication links. However, it should be understood that any of the wireless communication links may be implemented as wired communication links and any of the wired communication links may be implemented as wireless communication links, including combinations thereof.

Structure 120 includes a computing device 122. Computing device 122 may be any type of computer, computer system, tablet computer, smartphone, server, home automation system, or any electronic device used to send or receive information electronically. Structure 120 also includes communication device 124. Communication device 124 enables electronic communication between computing devices, such as computing device 122, and other devices or networks as described in further detail herein. In some cases, communication device 124 may be a modem, a cable modem, a DSL modem, a hub, a router, a gateway, a proprietary communication device, and/or a combination thereof.

Network 160 includes any network or combination of networks or components used for electronic communication, including the Internet. While network 160 is illustrated as a single element, network 160 may include many different elements, such as routers, hubs, and gateways, and may be distributed across or throughout a wide variety of geographical locations.

Wireless network 150 includes any network or combination of networks or components for electronic wireless communication, including cellular systems and networks. While wireless network 150 is illustrated as a single element, wireless network 150 may include many different elements such as antennas, routers, hubs, and gateways, and may be distributed across a wide variety of geographical locations. In one example, wireless network 150 may include a local cellular antenna, and accompanying systems, through which communication device 112, communication device 124, and/or other devices conduct wireless communication.

Personal electronic device 130 is any type of personal or portable electronic device used for communication, information retrieval, information viewing, and/or data storage. Personal electronic device 130 may be a cellular phone, a smartphone, a mobile communication device, a mobile computing device, a portable computing device, a tablet, a phablet (phone/tablet), a portable computer, a personal video player, an electronic media reader, an audio player, a handheld scanner, a camera, a GPS device, and/or an electronic computing or communication device of another type, including combinations thereof.

Personal electronic device 130 may be used to communicate with other devices described herein using one or more of the wireless communication methods. Personal electronic device 130 may be used to communicate with, control, and/or gather information from or about parcel box 110 as described in the various examples herein. While personal electronic device 130 is illustrated outside of structure 120, personal electronic device 130 may also be used inside structure 120, inside another structure, and/or potentially at any geographic location. Personal electronic device 130 may communicate directly with communication device 112 and/or communication device 124 when in proximity to one or both of these devices and may also communicate with them through one or more of wireless network 150 and network 160, particularly when in other geographic areas.

In environment 100, a party associated with parcel box 110 orders one or more products from seller 190. The one or more products may be ordered electronically, by phone, and/or may be part of an automatic shipment. The order specifies that the products are to be shipped to a particular location where parcel box 110 is present. The products are shipped from warehouse 195 to parcel box 110 in the form of a parcel using delivery vehicle 180. Warehouse 195 may or may not be at the same physical location as seller 190. Delivery vehicle 180 is illustrated as a single vehicle but may include a variety of vehicles or transport mechanisms to complete the entire shipping process including: one or more trucks, one or more cars, one or more self-driving vehicles, one or more aircraft, one or more boats, one or more bicycles, and/or one or more drones. The delivery services may be provided by one or more delivery service entities such as United Parcel Service (UPS), Federal Express (FedEx), DHL, The United States Postal Service (USPS), other postal service providers, local delivery services, local couriers, and/or combinations thereof. Beneficially, more than one of these entities may have capability and/or permission or access to deliver parcels to parcel box 110.

In some situations, delivery vehicle 180 and/or an operator of delivery vehicle 180 may use portable delivery computer 182 to gather, receive, store, and/or transmit information related to delivery of parcels. Among other functions, portable delivery computer 182 may be used to track or document when and where a parcel has been delivered. Portable delivery computer 182 may communicate with communication device 112 of parcel box 110 as further detailed in the examples herein. Further, portable delivery computer 182 may communicate with other devices or systems through wireless network 150 and/or through a system included in delivery vehicle 180. As described herein, parcel box 110 interfaces to and/or becomes part of the network of interconnected computer systems that provide and share information about parcel deliveries.

As discussed in the various examples herein, parcel box 110 may include a variety of smart features enabling an owner or operator of parcel box 110 to manage, configure, monitor, and/or otherwise operate parcel box 110. While some of these functions may involve direct communication with parcel box 110, in some cases one or more functions or features of parcel box 110 may be managed, configured, monitored, and/or operated on, through, or with a remote server or computing platform. Parcel box management server 140 is one example of a computing system which may be used for one or more of these functions. Parcel box management server 140 may include a server, a computer, a computer processor, a proprietary computing platform, network storage capabilities, memory, a hard drive, and/or other computing hardware components. Parcel box management server 140 may also include software and/or other tools for performing the functions, or subsets of the functions, described in the various examples herein. Parcel box management server 140 may be accessed or used by any of computing device 122, parcel box 110, portable delivery computer 182, personal electronic device 130, seller 190, warehouse 195, and/or other devices or parties involved in the delivering parcels to or picking up parcels from parcel box 110. Although parcel box management server 140 is illustrated as a single device, parcel box management server may be distributed across a number of computing devices and/or locations. In addition to being used to manage the various features, options, and/or configurations described herein, parcel box management server 140 may also include account management tools.

In some cases, the various features, options, and/or configurations of the parcel boxes described herein may be offered on a subscription basis and/or under a pay-for-use model. Several of the features described herein and/or subsets of the features may be purchased or paid for by any combination of the parties described herein. In one example, an owner or user of parcel box 110 may pay incrementally for use of certain features or groups of features. In another example, parcel delivery or pickup companies may pay to have access privileges to parcel box 110 for the benefit of the owner or user of parcel box 110. In some cases, parcel box 110 may have a flat rate. In other cases, the charges may have or include a per parcel fee. Further, parcel box 110 may be rented, leased, used on a subscription basis, and/or otherwise provided under various business models which may not necessarily include outright ownership of parcel box 110 by the end user. In some cases, the business model may also include setup fees, installation fees, per parcel fees, and/or monthly usage fees.

Figure 2:
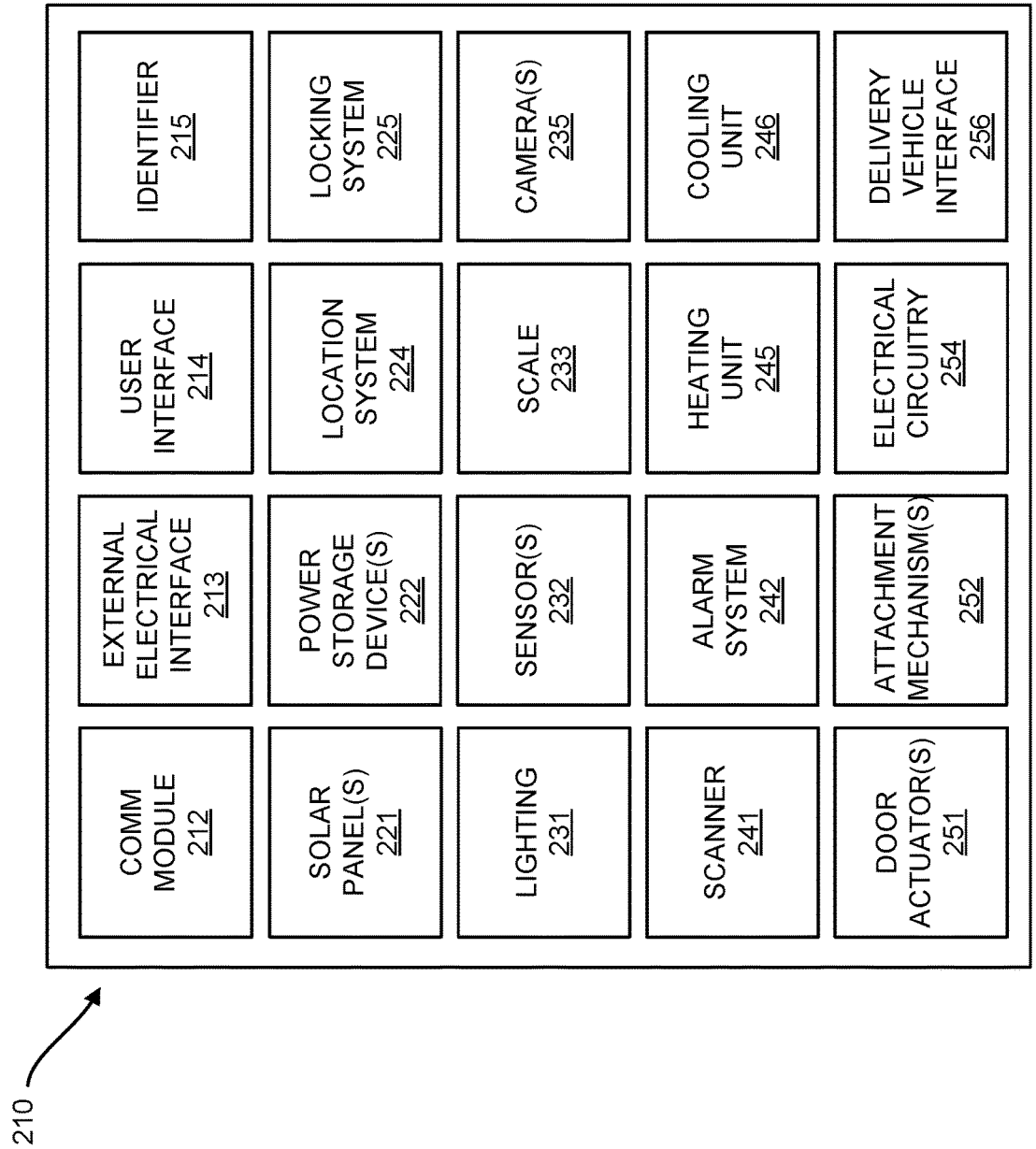
FIG. 2 illustrates a block diagram of a parcel box.

FIG. 2 illustrates a block diagram of a parcel box 210. Parcel box 210 is an example of parcel box 110 and may include any of the elements, features, functions, and/or characteristics of parcel box 110. While the mechanical and/or electrical interconnections between various combinations of the elements of parcel box 210 are not illustrated in FIG. 2, it should be understood that any element of parcel box 210 may interact, mechanically and/or electrically, with other elements of parcel box 210. Electrical interaction between various elements of parcel box 210 may be through wired connections, wireless connections, or both.

Parcel box 210 includes communication module 212. Communication module 212 is an example of communication device 112 and may include any of the elements, features, functions, and/or characteristics of communication device 112. Communication module 212 may be configured to conduct one or more types of wired or wireless electronic communication with devices such as communication device 124, personal electronic device 130, network 160, wireless network 150, portable delivery computer 182, other electronic devices or systems, and/or combinations thereof. Communication module 212 may also be capable of receiving and/or transmitting electronic communications directly from/to satellites and/or aircraft. Internet communication via satellite may be useful in circumstances when parcel box 210 is in a location where wireless network 150 and/or other communication networks are not available. Communication module 212 may also be capable of direct or indirect electronic communication with delivery vehicle 180, regardless of whether delivery vehicle 180 is a terrestrial vehicle, an airborne vehicle, a drone, a boat, or another type of delivery vehicle.

Parcel box 210 includes electrical circuitry 254 for performing, controlling, or otherwise assisting with the various functions described herein. Electrical circuitry 254 may include a computer processor, a digital signal processor, an application specific computer, memory, analog components, digital components, discrete components, an integrated circuit, an application specific integrated circuit (an ASIC), a programmable device, a printed circuit board, an electrical connector, an electromechanical connector, and/or any other electrical, electronic, and/or electromechanical components. The memory of electrical circuitry 254 may contain non-transitory computer-executable software instructions for use by a computer processor to perform some or all of the functions described herein. Some or all of the memory may be in the form of a removable memory device or card.

Parcel box 210 is designed to receive and temporarily store parcel(s). As described in further detail in other examples, parcel box 210 may include one or more storage compartments or cavities for the parcel(s) to at least temporarily protect the parcel(s) from theft and/or from the elements. The one or more storage compartments may each include one or more locking features, such as locking system 225, that enable the parcel(s) to be secured in parcel box 210 and only accessed by permitted persons or enabled devices. Locking system 225 may include an electronic lock that can be electronically locked or unlocked by an electronic device such as user interface 214, personal electronic device 130, portable delivery computer 182, and/or computing device 122. Locking system 225 may be electronically locked or unlocked through direct communication with one of these other devices or it may receive electronic communication through other devices and/or networks.

Locking system 225 may include electrical, electronic, mechanical, and/or electromechanical components. Locking system 225 may interface to or work in conjunction with door actuator(s) 251 to allow opening of one or more doors which provide access to the compartment(s) of parcel box 210. Door actuator(s) 251 may simply lock and unlock the door(s) or may also physically open and close the door(s). Door actuator(s) 251 may physically open the door(s) to make it easier for a delivery person who is carrying a parcel, to accommodate a drone delivery system, and/or to accommodate an unmanned delivery vehicle or system. Door actuator(s) 251 may include a motor, a servo, a solenoid, a spring, a pressurized cylinder, and/or a pneumatic device.

Parcel box 210 may also include sensor(s) 232 for sensing various parameters related to parcel box 210. Sensor(s) 232 may include an inside temperature sensor and/or an outside temperature sensor. Sensor(s) 232 may also include a movement sensor, an accelerometer, a proximity sensor, a door switch, a motion sensor, and/or a tamper sensor for detecting when parcel box 210 has been moved, tampered with, and/or opened without authorization.

Parcel box 210 also includes cooling unit 246 which may include various types of cooling or refrigeration components for cooling one or more of the parcel compartment(s) or cavities of parcel box 210 and/or one or more other areas of parcel box 210, including areas containing electronics. In some situations, cooling unit 246 may also be referred to as a refrigeration unit. The one or more parcel compartment(s) may be cooled to preserve or protect a parcel that has been delivered, such as perishable groceries or pharmaceuticals. In addition, the one or more parcel compartment(s) may be used for delivery of prepared food or for delivery of fresh ingredients for self-prepared meals.

Similarly, heating unit 245 may be used to heat one or more compartments or cavities of parcel box 210 to a preferred temperature or to a preferred temperature range to keep a parcel from freezing and/or to keep it in a preferred temperature range. In some situations, parcel box 210 may be used for delivery of prepared food and heating unit 245 may be used to keep that food hot until it is removed. Parcel box 210 may also include one or more fans for use alone or in conjunction with cooling unit 246. One or more of heating unit 245 and cooling unit 246 may also be referred to as a temperature control system, a temperature control module, a heating unit, a cooling unit, ventilation, and/or a heating, ventilation, and cooling (HVAC) device.

Temperatures that are maintained in one or more compartments of parcel box 210 using cooling unit 246 and/or heating unit 245 may be set based on information or based on product information provided by one or more of: computing device 122, personal electronic device 130, portable delivery computer 182, parcel box management server 140, a label or tag on a parcel, seller 190, and/or warehouse 195. One or more of these systems may provide information, package information, shipment, information, an/or delivery data about the product being delivered and/or may provide a preferred temperature or range associated with the product enabling parcel box 210 to provide a preferred environment for the parcel until it is removed. In some cases, parcel box 210 may begin controlling the temperature when the product arrives. In other cases, parcel box 210 may receive information about the parcel before it arrives, including an expected arrival time or estimated delivery time, in order to prepare the environment, including the temperature, before the parcel arrives.

Parcel box 210 may include power storage device(s) 222 for powering various components of parcel box 210. Power storage device(s) 222 may include one or more batteries, one or more rechargeable batteries, and/or one or more fuel cells. Alternately, or in addition, power storage device(s) 222 may comprise a fuel tank that stores fuel for power a generator or other power generation device for powering one or more components of parcel box 210. In some configurations, parcel box 210 may include solar panel(s) 221 for photovoltaically generating energy for immediate use and/or for storage in power storage device(s) 222. In addition, or alternatively, parcel box 210 may receive electrical power from an external electrical source through an external electrical interface, such as external electrical interface 213. A power source may be connected to external electrical interface 213 permanently, semi-permanently, or only temporarily for purposes of charging power storage device(s) 222. In addition to providing power, external electrical interface 213 may also be used for exchanging data communications between parcel box 210 and other devices.

Parcel box 210 may also include user interface 214. User interface 214 may include one or more means for directly interacting with parcel box 210 in addition to the interaction with parcel box 210 that occurs through other devices or systems. User interface 214 may include buttons, a keypad, an interactive user panel, a display, a liquid crystal display, indicators, a touch screen panel, a touch sensitive panel, a gesture sensing device, a biometric input device, a biometric sensor, a fingerprint scanner, an iris scanner, a microphone, a speaker, and/or other visual, audible, or tactile components for facilitating interaction between a human and parcel box 210. Some or all of the features accessible through user interface 214 may also be accessible through a software interface on a device such as personal electronic device 130, computing device 122, and/or portable delivery computer 182. In one specific example, some or all of the features available at user interface 214 may be controllable from a software application (also referred to as "an app") running on personal electronic device 130 and/or may be accessible through a webpage hosted on parcel box management server 140. In some cases, the software application may be downloadable from parcel box management server 140.

Parcel box 210 may also include location system 224 for determining and/or communicating a location of parcel box 210. Location system 224 may include a GPS (global positioning satellite) module for determining location using the GPS system. Location system 224 may also include components or circuitry for determining location using other techniques including using wireless network 150 and/or using triangulation techniques. The location information generated by location system 224 may be used in several ways. In one use, the location information may be used upon initial installation of parcel box 210 to establish a known, fixed location for parcel box 210. In a further use, the location information may be transmitted to a seller 190, to a delivery person, and/or to delivery vehicle 180 for purposes of more efficiently guiding delivery vehicle 180 to parcel box 210 for a delivery. The location information may be used in conjunction with or as an alternative to conventional street addresses.

In a further use, the location information generated by location system 224 may be used when an order is placed. The location information may be received by computing device 122 and/or personal electronic device 130 and transmitted along with the order to seller 190 and/or warehouse 195 just as a street address would traditionally be provided. In this way, parcel box 210 becomes the delivery location.

In some cases, the location information may be refreshed and updated periodically. For example, when parcel box 210 is periodically moved or is associated with a vehicle that moves, such as a recreational vehicle, the location information may be associated with parcel box 210 such that the location of parcel box 210 can be determined at the time of delivery or shortly before the time of delivery. In this way, someone who is moving about periodically in a recreational vehicle can place an order and still expect to have their parcel delivered even though they have relocated since the order was placed. A delivery service and/or portable delivery computer 182 may request the current location of parcel box 210 through one or more of network 160 and wireless network 150 shortly before delivery such that the delivery location can be determined/updated in real-time, or in near real-time. As more advanced delivery systems, such as drone delivery systems, are designed and implemented, dynamic location updates of the type described herein may even facilitate delivery to mobile vehicles and watercraft.

In yet another use of location information, location system 224 may transmit location information if parcel box 210 is stolen, moved without authorization, relocated without authorization, or misplaced. The location information may be transmitted over wireless network 150 and/or another communication network to assist in the recovery of parcel box 210 and/or its contents.

Continuing with the security features, parcel box 210 may include alarm system 242 that provides alerts when parcel box 210 is removed, disturbed, stolen, relocated without authorization, is not operating properly, and/or is tampered with. Alarm system 242 may provide visual alarms, audible alarms, and/or may provide alarm notifications to one or more of computing device 122, personal electronic device 130, parcel box management server 140, and/or portable delivery computer 182. In some cases, an alert from alarm system 242 may cause a delivery to be stopped, returned, or rerouted. This may be particularly important when the parcel includes a sensitive item that will be damaged without cooling or heating and/or a high value item for which security is a necessity. In some cases, parcel box 210 may provide a notification when power storage device(s) 222 are low on charge and/or not operating properly.

Parcel box 210 may also include scale 233 for determining a weight of one or more parcels inside parcel box 210. The determined weight may be transmitted, using communication module 212 and electrical circuitry 254, to one or more other devices. A recipient of the parcel can be made aware of the weight of the parcel before physically retrieving the parcel. The weight maybe useful in helping determine the content of the parcel and or remotely determining if the expected objects are inside the parcel.

In some cases, the weight determined by parcel box 210 using scale 233 may be compared to a weight of the parcel when it left warehouse 195 to determine if the parcel has been tampered with, emptied, and/or had items removed during the shipping process. The weight may be transmitted to or made available to any of computing device 122, personal electronic device 130, portable delivery computer 182, warehouse 195, seller 190, and/or parcel box management server 140. In some cases, an alert may be automatically generated if the weight is not within an expected range when the parcel is placed in parcel box 210. The expected weight information may be retrieved or received by parcel box 210 prior to or at the time of arrival of the parcel.

Parcel box 210 may also include lighting 231. Lighting 231 may include light generating devices inside of parcel box 210 and/or outside of parcel box 210. Light generating devices may include light emitting diodes (LEDs), incandescent lights, and/or fluorescing elements. Internal lighting may help a delivery person and/or parcel recipient with handling of a parcel when it is dark. External lighting may assist generally with safety when moving around parcel box 210 and/or may generally provide an accent, yard, or landscaping lighting purpose. Any external lighting may also serve to provide a quick visual indication of a status of parcel box 210 such as whether it is operating correctly, whether it is empty, whether it contains a parcel, whether it partially full, whether it is completely full, whether it has space available, and/or other status conditions.

Lighting 231 may also include one or more visual indicators to indicate to an owner and/or to a parcel delivery/pickup person that a parcel is currently inside parcel box 210. In some configurations, owners and delivery company personnel maybe notified using a variety of indicators or alert mechanisms. In some configurations, visual indications or alerts may be accompanied by one or more electronic messages transmitted to one or more of the electronic devices or computer systems discussed herein. In another example, lighting 231 and/or one or more electronic messages may be used to indicate to a delivery person that parcel box 210 is not currently receiving parcels or packages because the owner is out of town, because parcel box 210 is full, and/or because parcel box 210 is not operating correctly.

Parcel box 210 may also contain one or more camera(s) 235 and/or other types of optical capture devices or data capture devices. One of camera(s) 235 may be directed inward to provide images or video of the contents of parcel box 210. In this way an owner of parcel box 210 can check the contents from virtually any location. Camera(s) 235 may also contain an outward facing camera that provides images or video of anyone who opens or accesses parcel box 210. An outward camera may also be used as part of an access control system for parcel box 210. The camera may be used for an iris scan, a fingerprint scan, an identification badge scan, or other data input process for purposes of permitting opening of parcel box 210. Various access criteria can be established and parcel box 210 can be opened, or may automatically open, when data captured by the camera matches or satisfies an access criteria. In this way, parcel box 210 may keep a record of everyone who has accessed it.

Further, one or more cameras or optical capture devices may be used to provide a real time image of someone who is requesting access to parcel box 210. In other words, someone may approach parcel box 210, request access using user interface 214, and an image of that person may be transmitted to an owner/operator of parcel box 210 to allow the owner/operator to determine if he/she wishes to remotely unlock or provide access to parcel box 210 for the person captured in the image or video. This information may be transferred to a smartphone or computer of the owner/operator of parcel box 210. In addition, one or more of camera(s) may be used to capture an image or video of anyone who attempts to access parcel box 210 or disturbs parcel box 210.

In some cases, parcel box 210 may also include a microphone and/or a speaker. The microphone and/or speaker may enable live communication between a delivery person at parcel box 210 and an owner/operator of parcel box 210. The communication may be routed to the owner/operator through a call to personal electronic device 130, communication device 124, and/or computing device 122. In some cases, this communication may make use of network 160 and/or wireless network 150.

Parcel box 210 may include a unique identifier, such as identifier 215. Identifier 215 may be used to identify parcel box 210 for purposes of delivery, similar to the way a street address is traditionally used. However, as described herein, parcel box 210 may be relocated or movable such that the deliveries can continue even though it has been moved. Identifier 215 serves as the unique, constant identifier for parcel box 210 even though its location may change. Identifier 215 may exist and/or be used in a number of ways including, but not limited to: identifier 215 may be electronically stored in electrical circuitry 254, identifier 215 may be electronically transmitted to other devices using one or more of electrical circuitry 254 and communication module 212, identifier 215 may be periodically electronically transmitted from parcel box 210 in the form of a beacon signal, and/or identifier 215 may be visible on parcel box 210 in human readable form. Further, identifier 215 may be visible inside and/or outside parcel box 210 in a machine readable form such as a bar code, a one-dimensional barcode, a 2-dimensional bar code, a 3-dimensional bar code, a QR code, and/or another optical machine readable format. In other examples, identifier 210 may be electronically transmitted to another electronic device that is in close proximity, such as using RFID techniques and/or NFC techniques. In some cases, this information may be transmitted to portable delivery computer 182 when it is at or near parcel box 210 for purposes of a delivery or pick up.

Parcel Box 210 may also include scanner 241 which may include components for optically and/or electronically reading or capturing information from a parcel and/or from another device such as portable delivery computer 182. Scanner 241 may include a bar code scanner for reading one or more machine readable codes or identifiers such as a bar code, a one one-dimensional barcode, a 2-dimensional bar code, a 3-dimensional bar code, a QR code, and/or another optical machine readable format. The information may be read from the outside of one or more parcels that are inside parcel box 210, being placed into parcel box 210, and/or being removed from parcel box 210. In some cases, scanner 241 may be referred to as a parcel reader, a parcel reading device, and/or a parcel input device.

In some cases, scanner 241 may also electronically read information from one or more parcels, objects, and/or devices. Scanner 241, alone or in conjunction with communication module 212, may include including components for electronically reading information from one or more parcels that are inside parcel box 210, being placed into parcel box 210, and/or being removed from parcel box 210. Further, scanner 241 may also be used for electronically reading other information such as an identifier of delivery vehicle 180, an identifier of portable delivery computer 182, and/or an identifier on a badge or other credentials of a person placing a parcel into or removing a parcel from parcel box 210. Scanner 241 may utilize near field or low power electronic communication technologies or formats such as, for example, RFID, NFC, Bluetooth®, Bluetooth® Lower Energy, Bluetooth® Smart, and/or a proprietary communication technology or format, such as Google® Weave™. In some cases, scanner 241 may include a camera for capturing images, pictures, and/or video of a parcel inside parcel box 210. In some cases, scanner 241 may also be used to communicate with other electronic devices which may sometimes be in close proximity to parcel box 210.

In some examples, scanner 241 may also be used for reading other information such as an identifier of delivery vehicle 180, an identifier of portable delivery computer 182, and/or an identifier on a badge or other credentials of a person placing a parcel into or removing a parcel from parcel box 210.

Parcel box 210 may also be compatible with and/or interface to home automation systems, home security systems, alarm systems, building automation systems, building security systems, and/or HVAC systems. Parcel box 210 may also interface to or be compatible with one or more Internet-of-things protocols and/or home automation communication formats, protocols, or systems including Bluetooth®, Bluetooth® Low Energy, Bluetooth® Smart, Zigbee®, Z-Wave®, Weave™, Thread, 6LoWPAN, WiFi, NFC, RFID, ANT, ANT+, IEEE 802.15.4, Sigfox®, Neul®, LoRaWAN®, and/or others, including combinations thereof. In some cases, parcel box 210 may conduct peer-to-peer communication with other items or systems that are within or interface to an automated home or business ecosystem. Parcel box 210 may also use or be compatible with one or more wireless power transfer standards.

Parcel box 210 may also include attachment mechanism (s) 252. Attachment mechanism(s) 252 may include one or more attachment mechanisms for permanently, semi-permanently, and/or temporarily attaching or securing parcel box 210 to another object for security purposes. The other object may be a structure, a building, a home, a wall, a fence, a vehicle, a boat, a tree, the ground, and/or a foundation. Attachment mechanism(s) 252 may include one or more mounting components or mechanical interfaces, features, or components for attaching parcel box 210 to the other object (s). Attachment mechanism(s) 252 may be configured and/or adapted to make it difficult to remove parcel box 210 from the object, to deter theft and/or vandalism, and/or to improve security of parcel box 210 and its contents. In some cases, attachment mechanism(s) 252 may include an auger or spikes for securing parcel box 210 to the ground.

Attachment mechanism(s) 252 may also include separate mounting components which are permanently mounted to a structure or object. Parcel box 210 can then be removably mounted or attached to the separate mounting components. This configuration allows parcel box 210 to more readily be relocated or periodically moved between multiple locations. In one example, the separate mounting components may be a frame or structure that is built into or attached to a structure during construction with parcel box 210 being attached after construction is complete. This configuration provides a very secure connection because it can be attached to or engaged with structural elements of the building without parcel box 210 being present during the construction process and without parcel box 210 be in the way during construction or susceptible to damage during construction. A frame or separate mounting components of this type may be included as part of the construction process in order to optionally give the property owner of easily adding parcel box 210 at some point later in time.

In some cases, attachment mechanism(s) 252 may be mounted in a wall and/or may be interface to a mounting frame that can be included in the wall such that parcel box 210, and/or portions thereof, are accessible from both sides of the wall. In one example, an outside surface of parcel box 210 may be accessible at the outside wall of a structure to allow a delivery personnel and/or vehicles to access it from a door or panel positioned outside the structure to place or remove parcels. At the same time, an owner or occupant of the structure may access parcel box 210 from a door or panel that faces inside the structure. In this way, a residential home owner can install parcel box 210 in a wall of the home, or in the wall of a garage of the home, such that parcel deliveries can be picked up without going outside the home.

In a structure mounted configuration, parcel box 210 may make use of direct electrical connections through external electrical interface 213 to line power (such as 110 VAC or 220 VAC) and/or to a wired network connection. In this type of installation, parcel box 210 may also selectively make use of outside air and/or conditioned air from inside the structure to better maintain a preferred temperature environment inside parcel box 210, if any. In some configurations, one or more storage cavities of parcel box 210 may be primarily open to the inside of the structure such that there is free airflow to the one or more cavities and/or such that the one or more cavities are visible from inside the structure. In a further variation, one or more bars or screens may be included to allow this type of access from inside the structure while still prohibiting someone from climbing through parcel box 210 into the structure and/or to prohibit pushing a parcel or other object all the way through parcel box 210 into the structure.

In some configurations, parcel box 210 may interface with a garage door opener even though it may not be physically attached to the garage or a garage wall. In one example, parcel box 210 may be capable of transmitting signals to open/close a garage door in case a parcel being delivered is too large to fit in parcel box 210. In one example, the garage control could be activated from inside parcel box 210 thereby only permitting one who was able to access/unlock parcel box 210 to open the garage door. In another example, a code may need to be entered at parcel box 210 in order to open the garage door.

Parcel box 210 may also include delivery vehicle interface 256. Delivery vehicle interface 256 may include any types of mechanical and/or electrical interfaces for interfacing to automated or semi-automated delivery vehicle. In one example, delivery vehicle 180 may have mechanical features for automatically, semi-automatically, and/or robotically transferring a parcel from the delivery vehicle to parcel box 210. Parcel box 210 may be placed in proximity to a road, driveway, or curb such that delivery vehicle 180 can be positioned or stopped at a curb to allow it to interface to delivery vehicle interface 256 for delivery or pick up of a parcel. Delivery vehicle interface 256 may also include an electrical interface which communicates with delivery vehicle 180, through a wired interconnect or wirelessly, when a parcel transfer is taking place. These communication elements may be included in or separate from communication module 212.

In some cases, automated transfer of the parcel may take place for purposes of efficiency thereby relieving a vehicle driver of having to handle parcels or packages and/or get out of delivery vehicle 180. In other cases, delivery vehicle 180 may be an automated and/or driverless vehicle that must transfer parcels or packages to parcel box 210 in an automated fashion and conduct communications with parcel box 210 automatically because there is no driver or attendant present.

In further examples, delivery vehicle 180 may be a drone or other small aircraft. In this situation, delivery vehicle interface 256 may include electromechanical components or features for receiving the parcel from the drone and/or transferring a parcel to the drone. The drone may communicate with parcel box 210 wirelessly using communication module 212 or through a separate communication module configured for communication with the drone. In some cases, identifier 215 may send out a signal to the drone that includes identifying information for parcel box 210 and/or location information to assist in guiding the drone to parcel box 210. In some cases, the signal transmitted by parcel box 210 may be referred to as a drone beacon. Delivery vehicle interface 256 may also include a landing area for the drone. Because drones may be relatively small and have relatively short ranges, delivery vehicle interface 256 may also include features for supplying power to the drone from power storage device(s) 222 and/or from line power for purposes of recharging the drone, thereby extending the drone's range.

Parcel box 210 may also include features or have options for providing power to other types of delivery vehicles as well. In some cases, the delivered power and/or the service of providing the power from parcel box 210 to the drone, or another type of delivery vehicle, may offset a portion of the cost of the parcel and/or the cost of the delivery of the parcel. Other financial arrangements, compensation methods, or business models are possible with respect to providing power to delivery vehicles and/or to other parties.

FIG. 3 illustrates installed parcel box 310 in a use environment 300. Parcel box 310 is an example of parcel box 110 and/or parcel box 210 and may include any of the elements, features, functions, components, modules, and/or characteristics of parcel box 110 and/or parcel box 210. Parcel box 310 is associated with structure 120 and is installed or positioned near a street 388 which runs near structure 120. Parcel box 310 is installed or positioned near street 388 for convenience of a delivery person and/or for access by an automated, driverless delivery or pickup vehicle. As described in other examples herein, parcel box 310 may also be mounted in, on, or to structure 120.

Parcel box 310 may be constructed of any material or combination of materials, such as metals or plastics, to form a sturdy and durable enclosure. Parcel box 310 may have an outer housing that is designed to be weather resistant, weather proof, water resistant, water proof, snow resistant, snow proof, rain resistant, rain proof, dust resistant, dust proof, dirt resistant, dirt proof, and/or resistant to vandalism or theft. Parcel box 310 may include gaskets, seals, plugs, or covers around or over various openings or doors for making parcel box 310 resilient against these elements and forces, to protect parcels which may be inside parcel box 310, and to protect internal components of parcel box 310. Parcel box 310 may also include structural elements, frame elements, and/or a durable housing or shell making it resilient against impacts, external forces, ultraviolet damage, and/or vandalism. Some or all of the walls of parcel box 310 may include insulation to assist in maintaining a preferred temperature or temperature range inside parcel box 310. Insulation may be provided using traditional insulating materials or using other methods, such as vacuum panels.

Parcel box 310 may have a color that is chosen to coordinate with a nearby structure. Parcel box 310 may have a color that is chosen to blend in with the landscape. Parcel box 310 may have a universal or standard color which makes it easier for a delivery person to locate because they are always looking for the same color. Parcel box 310 may have reflective characteristics. Parcel box 310 may have a color that indicates a characteristic of the parcel box, such as different colors for different capacity parcel boxes. The color of parcel box 310 may be accomplished through painting, coating, anodizing, powder coating, and/or adding one or more pigments to a plastic resin used to make parcel box 310.

Parcel box 310 includes a door 359 for placing a parcel into or removing a parcel from parcel box 310. Although only one door 359 is illustrated, parcel box 310 may include multiple doors. In some configurations, parcel box 310 may include a door, opening, hatch, or chute on a top surface of parcel box 310 to better accommodate delivery from a flying delivery vehicle, such as a drone, which may land on the top surface of parcel box 310 and/or may deliver a parcel from above parcel box 310.

Door 359 may be unlocked and/or opened electronically and/or automatically using any of the techniques described herein. Parcel box 310 may be configured or operated such that door 359 may be opened by any of a plurality of parcel carriers, parcel delivery entities, and/or parcel pickup entities. In this way, parcel box 310 and/or the associated operation platforms may be carrier agnostic and/or carrier independent and may include a software interface that directly communicates with and exchanges data with computer systems of multiple carriers. Beneficially, the owner or user of parcel box 310 can receive or send parcels with a variety of these carriers or entities in a secure manner when the owner or user is not present, is on vacation, is unavailable, and/or does not want to be disturbed. These deliveries may also occur without subjecting the parcel(s) to risks associated with theft or exposure to the elements. Parcel box 310 also provides benefits to parcel carriers including: reduction of unsuccessful deliveries, reduction of redeliveries, improved efficiency, reduction in delivery distance from street, reduction in per-stop delivery time, reduction in risk of leaving unsecured parcels, improved customer satisfaction, automated interfaces for documenting/recording delivery or pickup of parcels, and/or improved interfaces for driverless and/or unmanned delivery vehicles.

In some cases, portable delivery computer 182 may begin communicating with parcel box 310 when it is within a designated proximity. This communication may automatically establish permission to access the box such that door 359 opens before, or just as, a delivery person is approaching in order to make their delivery more efficient and/or to make it easier for him or her to complete the task with full hands. In other cases, the carrier may use a fob, RFID device, NFC device, keypad, badge or other device for opening door 359.

In some cases, parcel box 310 may also include alternate, secure means of depositing a parcel. In one example, parcel box 310 may include a letter slot that allows thin parcels to be inserted without the ability to reach inside parcel box 310 through the slot or remove items through the slot. In another example, parcel box 310 may include a mechanical deposit mechanism, such as a drum or barrel mechanism, that allows a delivery person to put the parcel in and rotate or otherwise mechanically actuate the mechanism to release the parcel or package to the inside cavity of parcel box 310 without ever giving the delivery person access to the interior of parcel box 310. This type of secure insert mechanism allows an item to be put into the container without a key or code but keeps the item secure once it is inside. This feature may also be implemented in other ways, such as with a collapsing shelf that drops the item into a compartment when a door is closed.

As illustrated in FIG. 3, parcel box 310 also includes user interface 214, camera(s) 235, and solar panel(s) 221. However, parcel box 310 may also include any of the other components, elements, or modules of parcel box 110 of FIG. 1 or 210 of FIG. 2. Further, parcel box 310 may include hardware and/or software components for operating or performing the functions of parcel box 110 described with respect to operating environment 100 of FIG. 1.

Parcel box 310 may be manufactured and/or configured in a variety of sizes to accommodate a variety of parcel sizes. In some cases, parcel box 310 may be configured as a modular system wherein parcel storage compartments of various numbers and sizes may be added to or removed from parcel box 310 in a modular fashion without having to duplicate all of the modules illustrated in FIG. 2. In other words, multiple storage compartments may share use of any of the functional elements or modules of FIG. 2.

In some cases, parcel box 310 may be constructed of panels that fold down to a flat, or nearly flat, configuration for purposes of reducing shipping cost and/or storage space. When assembling, the panels fold out to form parcel box 310. In some cases, compartments of various sizes may each be compatible with or include the same locking mechanism, such as locking system 225.

Plastic components of parcel box 310 may be manufactured or molded using one or more of a variety of molding techniques including: injection molding, blow molding, compression molding, gas assist molding, rotational molding, structural foam molding, and/or thermoforming.

The examples which follow describe various scenarios, modes of operation, and configurations of a parcel box and/or a parcel box operating environment. The examples may be applicable to any of parcel box 110, parcel box 210, parcel box 310, operating environment 100, operating environment 300, and/or any of the other elements of operating environment 100 or operating environment 300. The features described in the following examples are described in terms of a 'system' as illustrated in FIG. 1. The described functions may be performed by or distributed across any of the devices and/or parties illustrated in FIG. 1 or 3, including, in part, by software or software applications running on one or more of the devices. The described functions are not intended to be limited to use on or performance by any particular device.

In one example, a user may be able to modify deliveries based on a provided vacation or travel schedule. The system may limit parcel deliveries during these time periods or for portions of these time periods. The following actions may take place based on a vacation schedule or travel schedule: hold instructions transmitted to the seller, warehouse, and or shipper, limiting shipments during the period to certain types of non-perishable shipments, activating indicators on the parcel box, changing heating or cooling settings on the parcel box to better preserve any parcels that are present, notifying a delivery driver before they arrive at the parcel box, establishing permissions for a friend, neighbor, or agent to access the parcel box during this period and/or establishing automatic notifications or message forwarding to the friend, neighbor, or agent for the period.

In another example, single or limited use codes may be used to allow others limited access to the parcel box. A user may establish a one-time use code for a friend who needs to drop off an item. Similarly, a user may establish a permission that lets someone access the parcel box at a certain frequency and/or only during certain windows of time (such as permission to deliver a Sunday newspaper only once per week, only on Sunday, and/or only between the hours 4 AM and 8 AM). In another example, an access code may only work on certain doors or compartments of a parcel box.

In another example, access to the parcel box may be limited based on the parcel and/or order. For example, all members of a family may generally have access or may have access by default. However, the user may have the ability to limit opening of the parcel box when the parcel is known to contain alcohol or has been shipped from a supplier of alcohol. Access may be limited such that the family's children cannot open the parcel box under those circumstances. Implementation of this feature is particularly convenient when the parcel box is opened using a biometric indicator and/or from a smartphone that is known to belong to a particular individual. In a further example, a user may be able to limit access if the parcel is a gift and the user does not want certain members of the family to see the gift or gift box when it arrives. These types of controlled access preferences can be set up in the system by a user and then activated when information from portable delivery computer 180 and/or scanner 241 indicates those parcel(s) are present.

In another variation, a user may be able to automatically enable access to the parcel box for a friend or neighbor. The user may be able to establish this access remotely. The friend or neighbor may access the parcel box using a smartphone, a software app, and/or an interface on the parcel box such as a keypad or a fingerprint scanner.

In another example, a parcel box may contain an internal handle, release, or lever for allowing someone who has been trapped inside the parcel box to release a door to get out. The handle, release, or lever may glow, may be internally lit, or may be lit by a light that is elsewhere inside the cavity such that the handle, release or lever can be seen in dark conditions.

In another example, a parcel box that is periodically relocated may have wheels making it easier to move. Relocating the parcel box may be desirable during periods of extended travel or vacation when the parcel box is moved or in situations where the parcel box is periodically moved between two or more locations.

In another example, a computer system of a delivery service may electronically check or query the status of a parcel box at a delivery location using one or more networks before a parcel is loaded onto the delivery vehicle. If the computer system determines that the parcel box is available, empty or partially empty, the parcel is loaded onto the delivery vehicle for delivery. If the parcel box is not available, the parcel is not loaded onto the delivery vehicle thereby avoiding the costs associated with a failed delivery attempt. The parcel box may not be available for a number of reasons including: the owner is on vacation and/or has indicated he or she does not want to receive parcels at this time, the parcel box is currently full, and/or the parcel box is not operating properly. The communication may also provide information about the delivery to the parcel box, including an estimated time of the delivery and/or information about any temperature preferences or requirements. This may provide the parcel box the necessary time to start cooling and/or heating systems to achieve those temperatures or achieve a specified temperature range.

In some cases, electrical circuitry of the parcel box may calculate a start time to start the cooling and/or heating system in order to achieve the preferred air temperature or air temperature range inside the parcel box at or before the estimated delivery time. The computer system of the delivery service may check or query the status of the parcel box by communicating with the parcel box directly and/or it may request the information from a parcel box management server or website accessible by the owner of the parcel box and/or the parcel box.

In another example, a delivery vehicle delivering a parcel to a parcel box may wirelessly communicate with the parcel box prior to arriving at the parcel box. The communication may occur from a device that is part of the vehicle and/or from a portable computing device carried by a driver of the vehicle. The communication may request the status of the parcel box prior to arriving at the parcel box in order to save the delivery driver/vehicle time if the parcel box is not available. The communication may also prepare the parcel box for the delivery by checking one or more other systems to determine if the parcel is expected, retrieve information about the parcel, and/or unlock the parcel box as the vehicle and/or delivery person is approaching the parcel box in order to save time.

In another example, an external optical device or scanner on the parcel box may be used to scan or capture information that permits access to the parcel box by the delivery person. The scanned or captured information may include a picture of the delivery person, a scan of an identification badge of the delivery person, electronically reading an identification badge or device of the delivery person or vehicle, reading an electronic fob of the delivery person or vehicle, a biometric scan of the driver, a scan of a physical or electronic tag on the parcel. In some cases, the owner of the parcel box may limit access for a particular company. The access may be limited to a particular day, a particular window of time, and/or a one-time use.

In some cases, the parcel box may verify delivery information before access is provided to the parcel box. For example, when information is received from the delivery vehicle prior to arrival and/or when a parcel is scanned by the external scanning device, that information may be validated against expected deliveries by communicating with one or more other systems. Whether access to the parcel box is provided may depend upon whether the parcel box can validate the expected delivery from these one or more other systems. In some cases, if a parcel is not expected and/or does not match expected delivery information, the parcel box may contact the owner in real time, or near real time, to allow the owner to make a determination as to whether access can be provided. The communication with the owner may include video and/or audio communication. In some cases, the communication may include an audio and/or video call to a personal electronic device of the owner which then gives the owner the option of opening or providing access to the parcel box for the delivery.

In another example, a parcel box may electronically and/or optically read a label or tag of a parcel inside the parcel box. The label or tag may include one or more pieces of information including: an identification of the shipment, a tracking number, an identity of the shipper, an identity of the shipping company, contents of the parcel, an expected weight of the parcel, and/or temperature or storage requirements of the parcel. Based on the information read from the parcel by the parcel box, the parcel box may take one or more actions including: notifying an owner of the presence of the parcel, detecting delivery of the parcel, notifying a designated agent of the parcel, notifying the owner of the content of the parcel, transmitting a message indicating arrival of the parcel, verifying or retrieving information about the parcel with one or more other systems, sending a notification based on the information retrieved from the one or more other systems, setting a temperature of the parcel box for the parcel, setting a status indicator on the outside of the parcel box, communicating information to a parcel box management server or website, transmitting an image of the parcel to an owner, operator, or agent of the parcel box, determining if the actual parcel weight is within an expected range based on weight information read from the parcel or from another system, communicating with a computer system of the shipper or seller, transmitting a message indicating receipt of the parcel, and/or performing one or more other actions based on preferences or configurations set by the owner, operator, or agent of the parcel box.

In a further example, an internal optical device, scanning device, and/or camera may track when a parcel is removed from the parcel box. Removal of the parcel may trigger messages or alerts to one or more parties including the shipper, the seller, and/or the owner, operator, or agent of the parcel box. In this way, the seller or shipper may be able to determine when the recipient has actually removed the parcel from the parcel box. This information may be exchanged through an automated transfer of information from the parcel box to a computer system of the seller or the shipper through a software interface. In addition, an external camera on the parcel box may also be configured to capture an image or video of the person removing the parcel from the parcel box.

In another example, a parcel box may keep track of how long a parcel has been present in the parcel box and may periodically send reminders or alerts to the owner, operator, and/or designated agent of the parcel box to remind them that a parcel is there to be removed. The reminder may be an email message, a text message, a message to a dedicated software app, a voice call, and/or a voicemail message and may be sent to or through any one or more of the electronic, computing, or network devices described herein.

While many of the examples herein are described with respect to delivery of a parcel to a parcel box, the apparatuses, methods, systems, features, functions, techniques, and improvements may also be applicable to the sending of parcels. In other words, an owner, operator, or agent of a parcel box may use the parcel box to temporarily store parcel(s) for pick up by a driver or a vehicle of a shipping or courier service. The parcel box may perform communication with any of the devices or systems described herein for purposes of facilitating pick up of the parcel from the parcel box and/or shipping of the parcel. In some configurations, a parcel box may have separate compartments, sections, and/or doors for incoming parcels and outgoing parcels.

Any of the techniques, improvements, features, functions, or processes described herein may be implemented in the form of a method. The method may be performed by one or more computer processors or systems along with one or more of the devices, components, elements, and/or modules described herein. The method(s) may be performed, at least in part, by executing non-transitory computer-executable software instructions that are stored in one or more non-transitory memory devices or systems.

Any of the techniques, improvements, features, functions, or processes described herein may be implemented in the form of a system. The system may include any combination of the devices, components, elements, and/or modules. Any of the devices, components, elements, and/or modules may also utilize the software platforms, software, and/or software tools described herein.

The techniques, elements, components, methods, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "on other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure is presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A parcel box configured for receiving and temporarily storing a parcel, the parcel box comprising:
   a weather resistant housing including a lockable door, the lockable door configured for providing controlled access to a protected cavity inside the weather resistant housing when the lockable door is in an opened position, the protected cavity configured for receiving the parcel for temporary secure storage of the parcel, the lockable door restricting access to the protected cavity when the lockable door is in a closed position; a communication module;
   an optical data capture device accessible at an exterior of the weather resistant housing, the optical data capture device configured for optically reading information off the parcel when the parcel arrives at the parcel box; and
   electrical circuitry configured for:
   transmitting, through the communication module, an availability message to a shipping company computer, the availability message indicating space availability in the parcel box, wherein the availability message distinguishes between space availability in the parcel box for: non-perishable parcels and for perishable parcels;
   transmitting, through the communication module, a parcel arrival message to a remote server after the optical information is read off the parcel, wherein the transmitted parcel arrival message includes at least a portion of the information optically read off the parcel;

receiving, in response to the parcel arrival message transmitted through the communication module, a validation message from the remote server if the optical information in the transmitted parcel arrival message corresponds to an expected delivery as determined by the remote server; and unlocking the lockable door in response to receiving the validation message.

2. The parcel box of claim 1 wherein the communication module utilizes a wireless data connection.

3. The parcel box of claim 1 wherein the communication module receives the validation message over the Internet from the remote server and the remote server is associated with a delivery service.

4. The parcel box of claim 1 wherein the communication module is configured to communicate with a wireless communication device positioned in a structure associated with the parcel box.

5. The parcel box of claim 1 further comprising a temperature control system configured for selectively controlling a temperature inside the protected cavity, wherein the electrical circuitry is further configured for operating the temperature control system to adjust the temperature inside the protected cavity to within a preferred temperature range prior to an estimated delivery time for the parcel.

6. The parcel box of claim 5 wherein the temperature control system includes a heater configured for heating the protected cavity and maintaining the temperature of the protected cavity within the preferred temperature range.

7. The parcel box of claim 5 wherein the temperature control system includes a refrigeration unit configured for cooling the protected cavity and maintaining the temperature of the protected cavity within the preferred temperature range.

8. The parcel box of claim 5 wherein the validation message includes delivery data indicating the preferred temperature range.

9. The parcel box of claim 8 further comprising a temperature sensor for measuring a current air temperature of the protected cavity, wherein operating the temperature control system to adjust the temperature includes calculating, based at least on the current air temperature and the preferred temperature range, a start time to activate the temperature control system in order to achieve the preferred temperature range in the protected cavity at or before the estimated delivery time.

10. The parcel box of claim 1 wherein the electrical circuitry is further configured for transmitting to a recipient of the received parcel an image of the received parcel inside the protected cavity, using the communication module.

11. The parcel box of claim 1 wherein the transmitted parcel arrival message includes at least a portion of the information optically read from the parcel.

12. The parcel box of claim 1 wherein a temperature control system controls the temperature at least until the parcel is removed from the parcel box.

13. The parcel box of claim 5 wherein the estimated delivery time is based, at least in part, on a determined location of a delivery vehicle scheduled to deliver the parcel relative to a location of the parcel box.

14. The parcel box of claim 1 further including an interface configured for receiving the parcel into the protected cavity from an automated driverless delivery vehicle.

15. The parcel box of claim 1 wherein the lockable door automatically unlocks in response to receipt of a wireless communication signal received when a delivery vehicle is in proximity to the parcel box, the wireless communication signal transmitted by one of a transmitter on the delivery vehicle and a transmitter in a portable delivery computer used by an operator of the delivery vehicle.

16. A delivery box for receiving and temporarily storing a package, the delivery box comprising:

a weather resistant shell including a lockable door, the lockable door adapted for providing access to a storage area inside the weather resistant shell, the storage area for receiving the package for temporary secure storage of the package, the lockable door restricting access to the package in the storage area when the lockable door is in a closed and locked position;

a communication module adapted for transmitting an availability message to a shipping company computer over one or more networks, the availability message indicating space availability in the delivery box, wherein the availability message distinguishes between availability for non-perishable parcels and availability for perishable parcels; and an optical barcode scanner accessible at an exterior at the delivery box, wherein the optical barcode scanner is configured for scanning a barcode on the package to read shipping information and configured for transmitting the shipping information to a remote server for validation before unlocking the lockable door thereby permitting the package to be placed in the storage area.

17. The delivery box of claim 16 further comprising a temperature control module adapted for adjusting a temperature of the storage area to within a preferred temperature range prior to an estimated delivery time for the package, the temperature control module further adapted for maintaining the temperature of the storage area within the preferred temperature range at least until the delivered package is removed from the storage area, wherein information indicating the preferred temperature range is included in at least one of delivery data and an input received from a user of the delivery box.

18. The delivery box of claim 17 wherein the delivery data is received over a network from a delivery schedule server associated with a service provider scheduled to deliver the package.

19. The delivery box of claim 16 wherein the validation at the remote server includes matching the scanned barcode to shipping information from a shipper.

20. The delivery box of claim 17 wherein the temperature control module includes a refrigeration unit and adjusting a temperature of the storage area includes operating the refrigeration unit to reduce the temperature of the storage area for a package including one or more perishable items.

21. The delivery box of claim 16 further comprising a rechargeable battery adapted for providing electrical power to the delivery box and a solar panel adapted for charging the rechargeable battery.

22. The delivery box of claim 16 wherein the communication module is adapted for transmitting status data to a smartphone of a user of the delivery box, wherein the status data includes at least one of information about the package and the temperature of the storage area.

23. The delivery box of claim 16 wherein the communication module transmits the availability message in response to receiving an inquiry message from the shipping company computer at the communication module through the one or more networks.

24. The delivery box of claim 16 wherein the availability message is based, at least in part, on a specified vacation schedule of a user of the delivery box.

\* \* \* \* \*